Oct. 8, 1963     C. J. CREVELING     3,106,683
"EXCLUSIVE OR" LOGICAL CIRCUIT
Filed Oct. 29, 1956
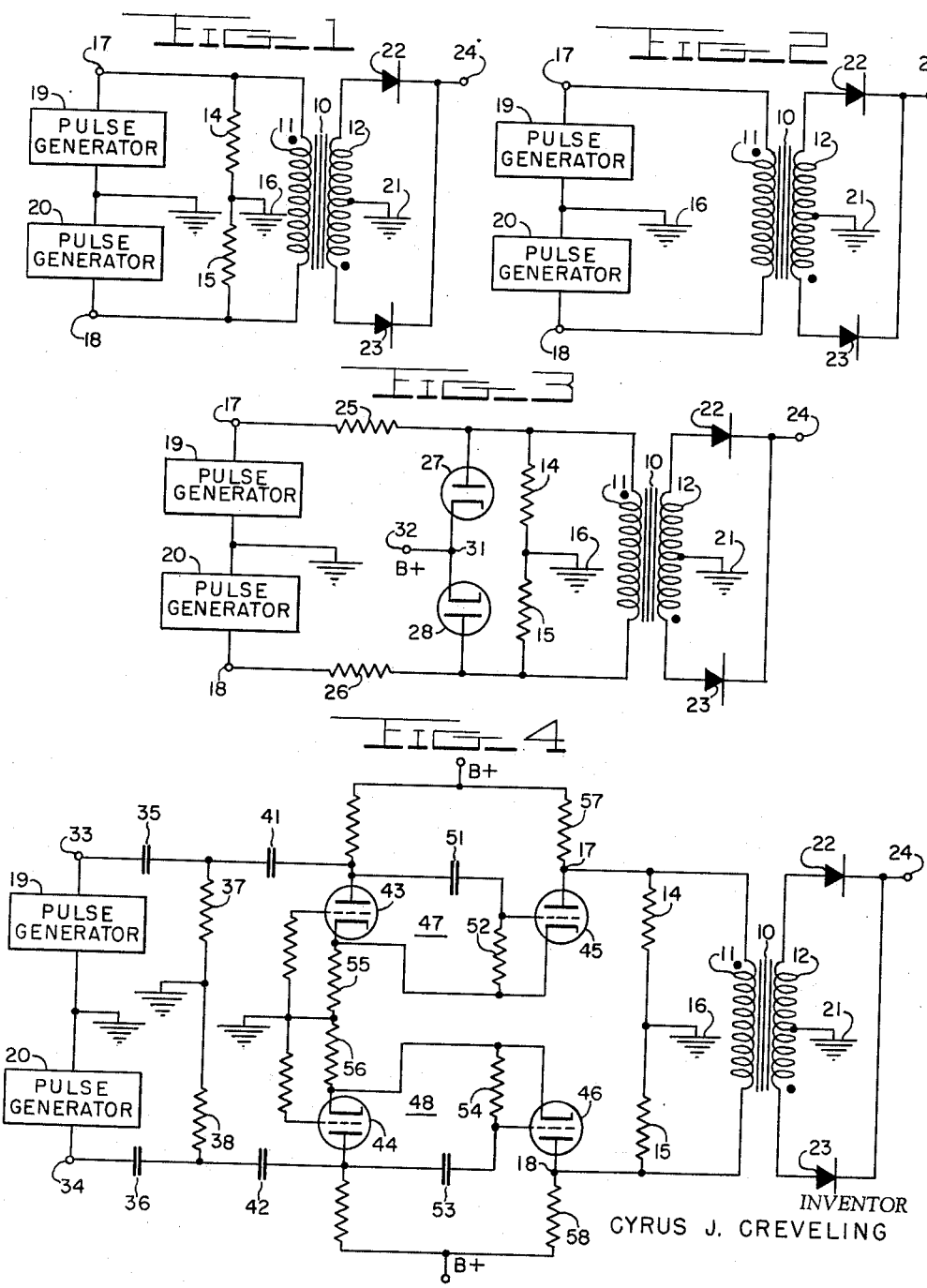
INVENTOR
CYRUS J. CREVELING
BY *W R Mattby*
*Richard Reed*    ATTORNEYS 3,106,683
"EXCLUSIVE OR" LOGICAL CIRCUIT
Cyrus J. Creveling, Oxon Hill, Md., assignor to the United States of America as represented by the Secretary of the Navy
Filed Oct. 29, 1956, Ser. No. 619,090
6 Claims. (Cl. 328—93)
(Granted under Title 35, U.S. Code (1952), sec. 266)

The invention described herein may be manufactured and used by or for the Government of the United States of America for governmental purposes without the payment of any royalties thereon or therefor.

This invention relates to pulse transfer logical circuits and more specifically to such circuits known as "exclusive or" circuits. An "exclusive or" circuit is one having a plurality of input terminals and a single output terminal at which a pulse is produced when a pulse is applied to one and only one of the input terminals. Considering a circuit with two input terminals, then no output pulse is produced when both input terminals receive pulses or when neither receive input pulses.

Logical circuits are used throughout complex computer circuitry for a variety of purposes including performing logical operations on binary numbers, and many such computers must contain a great number of logical circuits to properly perform complex calculations. It therefore becomes essential that the individual circuits be made as simple and with as few elements subject to failure as possible, if the complete computer is to be reliable and have a minimum of "down time." A great many logical circuits are known in which vacuum tubes are used to perform computing functions, however, these circuits are not as reliable as circuits using magnetic or semiconductor elements to perform these operations. Magnetic core logical circuits are known which can be used in an "exclusive or" operation, however, such circuits are relatively complex in comparison with the present invention.

Accordingly, an "exclusive or" circuit is provided which has as its basic component a simple transformer with input terminals provided at both ends of the primary winding for applying a pulse or signal between these terminals and ground. The secondary winding of the transformer has a center-tap which is grounded and two diodes connected to produce an output pulse of desired polarity regardless of the polarity of the signal induced in the secondary. If either input terminal receives a pulse, an output will result of the desired polarity, but if pulses coincident in time and of equal amplitude and width are received at both inputs to the primary no current will flow in the primary, no voltage will be induced in the secondary and hence no output pulse will result. Thus a very simple logical circuit has been provided which is dependable in operation and which will contribute greatly to computer reliability.

It is an object of the present invention to provide an electrical logical circuit which produces an output when either one or the other of its input terminals receives a pulse, but produces no output when pulses coincident in time and of equal amplitude and width are received at both input terminals.

It is a further object of the present invention to provide an electrical logical circuit of the "exclusive or" type which is reliable in operation and will contribute greatly to computer dependability.

Another object of the present invention is the provision of an electrical logical circuit of the "exclusive or" type which is compact, light, and suitable for use in an airborne computer system.

Other objects and many of the attendant advantages of this invention will be readily appreciated as the same becomes better understood by reference to the following detailed description when considered in connection with the accompanying drawings wherein:

FIG. 1 is a schematic representation of the "exclusive or" circuit of the present invention;

FIG. 2 is a schematic representation of another embodiment of the invention in which the resistors shunting the signal sources are eliminated;

FIG. 3 illustrates still another embodiment in which diode limiters are employed to insure input signals of equal amplitudes; and FIG. 4 shows still another embodiment of the present invention in which multivibrators are used to secure input pulses which are equal in amplitude and duration.

Referring to FIG. 1, there is shown a transformer 10 which has a primary winding 11 and a secondary winding 12. Resistors 14 and 15 are connected across the terminals of the primary winding and their common connection is grounded at 16. Input terminals 17 and 18 are provided for applying two input signals to the device, one between the ground connection 16 and terminal 17 and the other between ground 16 and terminal 18.

The output side of the device comprises a secondary winding 12 having a grounded center-tap 21, diodes 22 and 23 which are preferably germanium diodes but which may obviously take the form of selenium rectifiers or vacuum tubes, or the like and an output terminal 24.

Two signal generators 19 and 20 are connected between ground and the terminals 17 and 18. When only one signal is applied current flows through the primary winding 11, through the resistor positioned opposite the source which produced the signal and through the other signal generator, if said generator has a low impedance to ground. For example, if signal generator 19 produces an output pulse, current will flow through the primary 11, through resistor 15 and signal generator 20 to ground. As a result of current flowing in the primary winding a voltage is induced in the secondary winding 12 and an output pulse will appear at the output terminal 24.

If a positive input pulse is applied to the terminal 17 a positive output will appear at output terminal 24, as the upper side of the secondary 12 will go negative with respect to ground and the lower side will go positive with respect to ground, thus current will flow through diode 23 and a positive pulse will be developed at the output. Similarly, if a positive pulse is applied to the terminal 18, the upper end of the winding 12 will go positive with respect to ground and current will flow through diode 22 and a positive pulse will be developed at the output. Thus, voltage induced in the secondary of either polarity as a result of the positive pulses or negative pulses introduced into the two inputs will result in a positive output pulse. Signals or pulses which are equal in amplitude and duration applied across either terminal 17 or 18 will result in identical output pulses.

It is contemplated that the input pulses applied to terminals 17 and 18 will be quantized, that is, will be coincident in time and of equal amplitude and duration and as pointed out above if one input 17 or the other input 18, but not both, receive such a pulse an output at terminal 24 will result, but if these quantized pulses are applied to both input terminals 17 and 18, the upper and lower ends of the primary winding 11 will be at the same potential, no current will flow in the primary 11, no voltage will be induced in the secondary winding 12 and hence no output will result at terminal 24. It should be pointed out that if two pulses of unequal amplitude are applied simultaneously to input terminals 17 and 18, an output will appear at terminal 24 which is proportional to the difference in the two amplitudes. In this regard, the values of the resistors 14 and 15 can be set so that pulses of equal amplitude are developed across the primary winding 11, irrespective of their origin; signal generator 19 or signal generator 20. Although it is contemplated that signal generators 19 and 20 will produce quantized pulses, a change in value of either resistor 14 or 15 will insure that condition should signal generators 19 or 20 produce pulses of unequal amplitude. A change in the value of resistors 14 or 15 will only be effective to provide input pulses of equal amplitude if the differences between the amplitudes of the pulses produced by signal generators 19 and 20 is constant. If the differences are not constant a circuit as shown in either FIG. 3 or 4 is necessary.

As shown in FIG. 2, the resistors 14 and 15 are unnecessary if the signal sources 19 and 20 have impedance values to ground sufficiently low to permit an appreciable current flow in the primary winding 11 and if the two signal generators 19 and 20 produce output pulses of equal amplitude. With the resistors 14 and 15 removed, a pulse applied to terminal 17 by the signal generator 19 will produce a current in the primary winding 11 and return to ground through the opposite pulse generator 20. Conversely, if an input pulse is applied to terminal 18 by means of pulse generator 20, current will flow through the primary winding 11 and return to ground through the opposite pulse generator 19. Thus, if the impedance of pulse generators 19 and 20 is low, an appreciable current in the primary winding 11 will result and a voltage sufficient to produce a usable output at terminal 24 will be induced in the secondary winding 12. If the impedance of the pulse generators 19 and 20 is high, very little current would flow in the primary winding 11 and resistors 14 and 15 are necessary to provide a sufficiently low impedance path to ground to secure usable current in primary 11. In other respects the logical circuit of FIG. 2 functions the same as that shown in FIG. 1.

Referring to FIG. 3, there is shown a logical circuit similar to that of FIG. 1 but with the addition of series resistances 25 and 26 and diodes 27 and 28 which may be any unidirectional current device, for example, a silicon or germanium diode, connected across the terminals of the primary winding 11. As pointed out previously, if the pulses supplied to the input terminals 17 and 18 by the signal generators 19 and 20 are of different amplitude but that difference is not constant, changing of the value of the resistors 14 or 15 will be ineffective to provide pulses of equal amplitude across the primary winding 11. In this situation, where the differences in pulse amplitudes are not constant, the diodes 27 and 28 will effectively limit the amplitudes of the pulses applied to terminals 17 and 18 so that the pulses will be of equal amplitude.

A terminal of diode 27 is connected to a terminal of diode 28 by a lead 31 and these two terminals are biased to a certain positive potential by the battery 32. The value of the bias potential is normally determined by the minimum positive pulse potential which either of the signal generators 19 or 20 is expected to produce. The diodes 27 and 28 are so connected that neither conducts when positive pulses which do not exceed the bias potential are applied to either terminal 17 or 18 or to both said terminals, the diodes then appearing as open switches and the pulses reach the primary winding unchanged in value. It is apparent that the circuit behaves exactly like that of FIG. 1 when the positive pulse potential does not exceed the value of the bias potential. However the positive pulse potential applied to either or both of the terminals 17 or 18 by the pulse generators 19 and 20 will normally exceed the bias potential because the bias potential is set at the value of the minimum positive pulse potential which either signal generator is expected to produce. Therefore either or both of the diodes 27 and 28 conduct acting essentially as closed switches to connect the ends of the transformer primary 11 to the battery 32. Thus at no time can the positive pulse potential at the ends of the transformer winding exceed the value of the bias potential. This difference between the input pulse potential and the value of the bias potential appears as a voltage drop across the series resistors 27 and 28 as is the usual case in limiting circuits. Thus the value of the pulses produced by the signal generators 19 or 20 will be effectively limited so that the values of the pulses applied to the ends of the primary winding 11 will have the same amplitude. It is obvious that a similar circuit could be used if the pulse generators 19 and 20 produce negative pulses by reversing the connection of the diodes 27 and 28 and biasing their common connection to a negative potential, the value of which is determined by the minimum negative potential which the pulse generators 19 and 20 are expected to produce.

Another embodiment of the present invention shown in FIG. 4 will provide signals to inputs 17 and 18 of the primary winding 11 which are equal both in amplitude and pulse width. Assuming the pulses or signals applied to the terminals 33 and 34 may be unequal in either amplitude or width, the circuitry shown will produce pulses of equal amplitude and width at the input terminals 17 and 18 to the logic circuit disclosed in FIG. 1. In this form of the invention it is more advantageous to use negative pulses which may be produced by the signal generators 19 and 20 or if said signal generators produce positive pulses a single stage of amplification may be used to obtain a phase reversal and thus negative pulses. In this form of the invention it is contemplated that signal generators 19 and 20 will produce pulses substantially rectangular in form. These pulses are applied at the terminals 33 and 34 to a pair of differentiating circuits comprising condensers 35 and 36 and resistors 37 and 38. The differentiated pulses will have a negative pip followed by a positive pip and are applied through condensers 41 and 42 to the plates of a pair of triodes 43 and 44 which together with triodes 45 and 46 comprise a pair of conventional cathode coupled one-shot or start-stop multivibrators generally designated by the numerals 47 and 48. The time constant of the condenser 51-resistor 52 combination and the condenser 53-resistor 54 combination will, under ordinary conditions, be set so that the positive pip of the differentiated signal will not raise the grids of tubes 45 and 46 above cut-off and will therefore have no effect on the operation of multivibrators 47 and 48. If extraordinary conditions are encountered so that the pulse generators 19 and 20 produce pulses which are very nearly equal in duration to the time constant of the condenser-resistor combinations 51—52 and 53—54, so that the grids of tubes 45 and 46 are raised above cut-off by the positive pips and hence change the width of the output pulses from the multivibrators 47 and 48, a pair of diodes may be inserted between the resistor 37 and the condenser 41, and the resistor 38 and the condenser 42 to eliminate the positive pips of the differentiated signal.

In the stable state of the multivibrators 47 and 48, the triodes 43 and 44 are biased to cut-off by the voltage drops across the resistors 55 and 56. Thus, negative pulses applied to the plates of these two triodes reach the grids of the normally heavy conducting triodes 45 and 46 through condensers 51 and 53 to reduce the conduction through these tubes. When this action occurs, the tubes 45 and 46 are almost instantaneously cut-off while at the same time the tubes 43 and 44 commence to conduct very heavily. This state continues until the condensers 51 and 53 discharge sufficiently to raise the grids of tubes 45 and 46 above cut-off at which time tubes 45 and 46 become conducting and tubes 43 and 44 are cut off. As a result of this action, rectangular pulses which are of equal amplitude and duration are produced across the plate resistors 57 and 58 provided the circuit components of the multivibrator 47 are equal to corresponding circuit components of multivibrator 48. This circuit arrangement will provide rectangular pulses to the logic circuit which are equal in both amplitude and duration. In other respects the circuit of FIG. 3 behaves in the same manner as the circuit disclosed by FIG. 1.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention.

What is claimed is:

1. In a logical circuit, a plurality of electrical pulse generators, means connected to said electrical pulse generators for differentiating pulses produced thereby to provide trigger pulses, means for generating pulses of equal amplitude and duration in response to said trigger pulses, selector means for combining said pulses of equal amplitude and duration to produce an output pulse at such instants in time when only one electrical pulse generator produces output pulses.

2. In a logical circuit, first and second pulse generators, a first differentiating circuit connected to the output of the first pulse generator, a second differentiating circuit connected to the output of the second pulse generator, a first multivibrator connected to the output of said first differentiating circuit and adapted to be triggered by differentiated pulses produced by said first differentiating circuit, a second multivibrator connected to the output of said second differentiating circuit and adapted to be triggered by differentiated pulses produced by said second differentiating circuit, a transformer having primary and secondary windings, said primary winding having first and second input terminals, means connecting the first of said input terminals to the first multivibrator, means connecting the second of said input terminals to the second multivibrator, and means connected to said secondary winding for producing a selected polarity output.

3. In an electrical logical circuit a first signal source for providing a first pulse and a second signal source for providing a second pulse, means connected to said signal sources for developing a first trigger pulse from said first pulse and a second trigger pulse from said second pulse, means responsive to said first trigger pulse for producing a first rectangular pulse, and means responsive to said second trigger pulse for producing a second rectangular pulse which is equal in amplitude and pulse duration to said first rectangular pulse, and means for producing an output pulse when one of said rectangular pulses is applied thereto, and for suppressing production of output pulses when said first rectangular pulse and said second rectangular pulse are applied simultaneously thereto.

4. In an electrical logical circuit, a first signal source for producing a first pulse, a second signal source for producing a second pulse, means connected to said first signal source for developing a first trigger pulse from said first pulse, means connected to said second signal source for developing a second trigger pulse from said second pulse, means responsive to said first trigger pulse for producing a first rectangular pulse and means responsive to said second trigger pulse for producing a second rectangular pulse which is equal in magnitude and pulse duration to said first rectangular pulse, and combining means for producing an output pulse when either of said first or second rectangular pulses is applied thereto, and for suppressing production of pulses when said first and said second rectangular pulses are applied simultaneously thereto.

5. The electrical logical circuit of claim 4 in which said combining means comprises a transformer having a primary and a secondary winding, said primary winding having two input terminals to which said first and said second rectangular pulses are applied and means connected to said secondary winding for producing a voltage of a given polarity irrespective of the voltage induced in said secondary by the rectangular pulses applied to said primary.

6. In an "exclusive or" logic circuit, first and second pulse generator means, first pulse shaping means connected to said first pulse generator, second pulse shaping means connected to said second pulse generator, said first and second pulse shaping means providing output signals of equal amplitude and of equal duration, means for combining said signals of equal amplitude and of equal duration to produce an output pulse when only one of said first and second pulse generator means produces an output pulse.

References Cited in the file of this patent

UNITED STATES PATENTS

| Re. 24,614 | Haynes | Mar. 3, 1959 |
| 1,929,057 | Dellenbaugh | Oct. 3, 1933 |
| 1,969,536 | Winne | Aug. 7, 1934 |
| 2,010,069 | Emmens | Aug. 6, 1935 |
| 2,454,807 | Kennedy | Nov. 30, 1948 |
| 2,532,435 | Allen | Dec. 5, 1950 |
| 2,607,007 | Clark | Aug. 12, 1952 |
| 2,633,557 | Cabes | Mar. 31, 1953 |
| 2,659,823 | Vossberg | Nov. 17, 1953 |
| 2,675,473 | Femmer | Apr. 13, 1954 |
| 2,676,253 | Ayres | Apr. 20, 1954 |
| 2,689,328 | Logan | Sept. 14, 1954 |
| 2,788,489 | Hollywood | Apr. 9, 1957 |
| 2,846,667 | Goodell et al. | Aug. 5, 1958 |
| 2,896,091 | Nuttall et al. | July 21, 1959 |
| 2,914,751 | Steagall | Nov. 24, 1959 |
| 2,937,286 | Bonn et al. | May 17, 1960 |

FOREIGN PATENTS

| 720,750 | Germany | May 14, 1942 |
| 669,483 | Great Britain | Apr. 2, 1952 |